June 24, 1930.     A. H. DIXON ET AL     1,768,463

SHREDDER

Filed Oct. 21, 1929

Albert H. Dixon,
Ferdinand A. Henschell
and Thomas Simpson Robson
INVENTORS

BY *Victor J. Evans*
ATTORNEY

Patented June 24, 1930

1,768,463

UNITED STATES PATENT OFFICE

ALBERT H. DIXON AND THOMAS SIMPSON ROBSON, OF SEATTLE, WASHINGTON, AND FERDINAND A. HENSCHELL, OF VANCOUVER, BRITISH COLUMBIA, CANADA

SHREDDER

Application filed October 21, 1929. Serial No. 401,269.

This invention relates to a shredder for vegetables, fruits, etc., the general object of the invention being to provide a shredder formed with sharp shredding teeth so that the articles can be cut and shredded by the teeth with the minimum amount of effort and to provide the shredder with curved end portions which act as feet to support the shredder on a surface in spaced relation thereto and to provide means whereby the shredder can be supported in an inclined position in a bowl, with one of the feet forming members hooked over the edge of the bowl.

A further object of the invention is to reinforce the edges of the shredder by bending the edges into tubular form.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

As shown in these views, the shredder A is formed of a sheet of metal having its ends curved downwardly, as shown at 1, to form feet parts for holding the major portion of the shredder elevated from a surface with which the feet engage, with the edges reinforced by the tubular parts 2. The teeth 3 of the shredder are each formed by bending upwardly a small portion of the metal in front of a hole 4, the cutting edge 5 of each tooth being of arc shape and beveled, as shown at 4', so that the tooth will readily cut vegetables, fruit and the like when the article is drawn over the tooth carrying portion of the shredder or the shredder is drawn over the article. As will be seen, the particles cut from the article by the beveled portions 4' of the teeth will pass to the under side of the shredder.

As before stated, the device can be set on a flat surface so that the leg forming parts will hold the tooth carrying portion elevated from the surface or the device can be placed in a bowl or the like with one of the leg portions hooked over the edge of the bowl and the other leg portion resting upon the bottom of the bowl. When this is done, the shredder is held in an inclined position.

Figure 3:
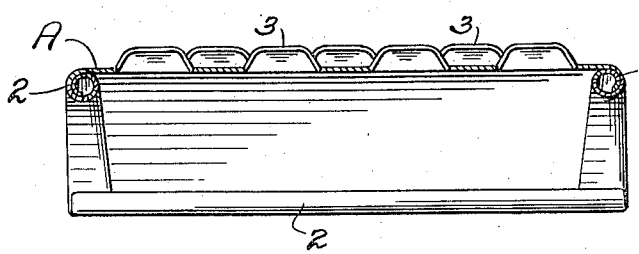
Figure 3 is a section on line 3—3 of Figure 1.
Figure 4:
Figure 4 is a section on line 4—4 of Figure 1.

Both the side edges and the end edges are of tubular form, though the end edges are smaller than the side edges. The metal which forms each tubular part has its extremity overlapping a portion of the tube, as shown in Figure 3, so that the tube is a closed one to prevent entrance of dirt and foreign matter thereinto. After the tubular parts are formed, the end portions of the side tubular parts are bent into curved form to form the curved portions 1 at the ends of the device. These tubular parts form reinforcing means, but it will, of course, be understood that the edges of the device can be reinforced in any suitable manner.

Figure 1:
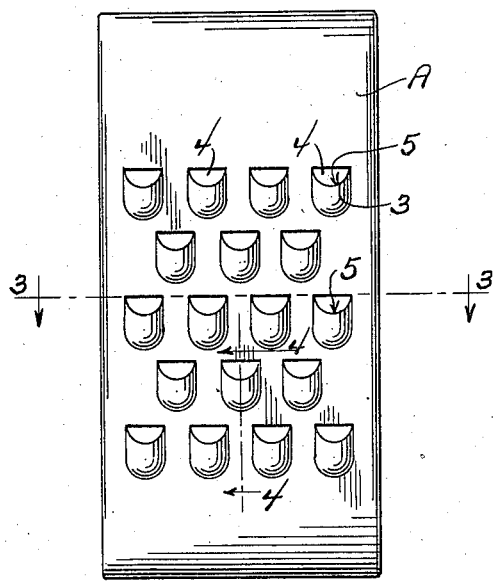
Figure 1 is a top plan view of the improved shredder.
Figure 2:
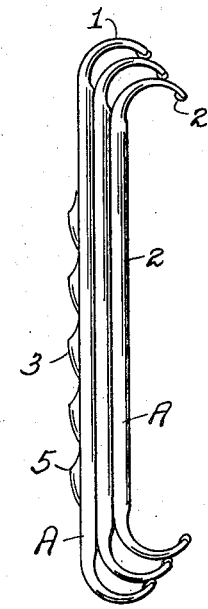
Figure 2 is a side view showing three shredders nested together.

The method of forming the teeth forms the subject matter of an application filed on October 21, 1929, Serial No. 401,268. As shown in Figure 2, we prefer to form the shredders in sets, each shredder of a set having different sized teeth thereon and to so form the shredders that they can be nested together, as shown in Figure 2. The curved ends have a certain degree of resiliency which acts to frictionally hold the shredders together when nested.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. A shredder of the class described comprising a body part formed of a single piece of sheet material and having downwardly bent ends forming feet and teeth in the body part having beveled cutting edges, each tooth being formed by perforating the body and raising a portion thereof in rear of each perforation, with the cutting edge formed by the perforation beveled, the side edges of the body being of closed tubular form to reinforce the body and the end edges of the body being folded over to provide reinforcing means.

2. A shredder of the class described comprising a body formed of a single piece of sheet material and having downwardly curved resilient ends forming feet, teeth in the body having beveled cutting edges, each tooth being formed by perforating the body and raising a portion thereof in rear of each perforation, with the cutting edge formed by the perforation beveled, the side edges of the body being of closed tubular form to reinforce the body and the end edges of the body being also of closed tubular form.

In testimony whereof we affix our signatures.

ALBERT H. DIXON.
THOMAS SIMPSON ROBSON.
FERDINAND A. HENSCHELL.